United States Patent [19]

Zimmer

[11] 4,148,496
[45] Apr. 10, 1979

[54] GOLF CART

[76] Inventor: John S. Zimmer, 413 S. Ellison La., Waynesboro, Va. 22980

[21] Appl. No.: 875,281

[22] Filed: Feb. 6, 1978

[51] Int. Cl.² .............................................. B62B 1/14
[52] U.S. Cl. ............................ 280/47.19; 280/DIG. 6
[58] Field of Search ...................... 280/47.19, DIG. 6; 150/1.5 B; 211/60 G

[56] References Cited

U.S. PATENT DOCUMENTS

| 2,419,175 | 4/1947 | Spohrer | 150/1.5 B |
| 2,547,829 | 4/1951 | Mills | 211/60 G |
| 3,014,760 | 12/1961 | Gard | 280/DIG. 6 |
| 3,265,106 | 8/1966 | Jarman | 280/DIG. 6 |
| 3,353,838 | 11/1967 | Schmid | 280/DIG. 6 |
| 3,483,996 | 12/1969 | Scammon | 211/60 G |

FOREIGN PATENT DOCUMENTS 804722  11/1958  United Kingdom .............. 280/DIG. 6

Primary Examiner—John A. Pekar
Attorney, Agent, or Firm—Cantor and Singer

[57] ABSTRACT

A golf cart of simple, inexpensive, lightweight and strong construction which will permit the secure placement of clubs in a series of holding mechanisms designed to hold the clubs by the lower end of the shafts and without the aid of pockets. The holding mechanisms are mounted on a platform which is part of a container used to store clothes, shoes, balls etc. The container forming the body of the cart, has wheels mounted on the sides and a handle mounted on the platform for pulling the cart.

8 Claims, 4 Drawing Figures

U.S. Patent  Apr. 10, 1979  4,148,496
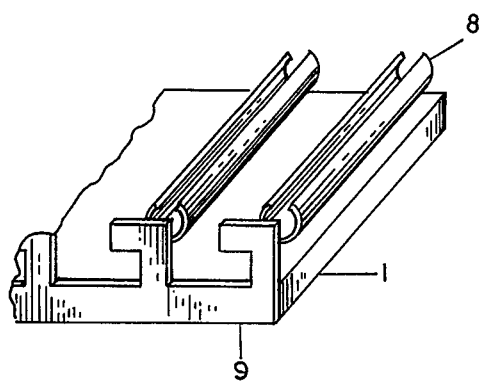
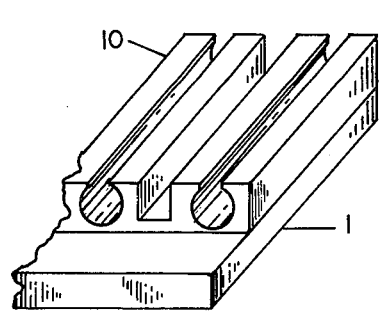
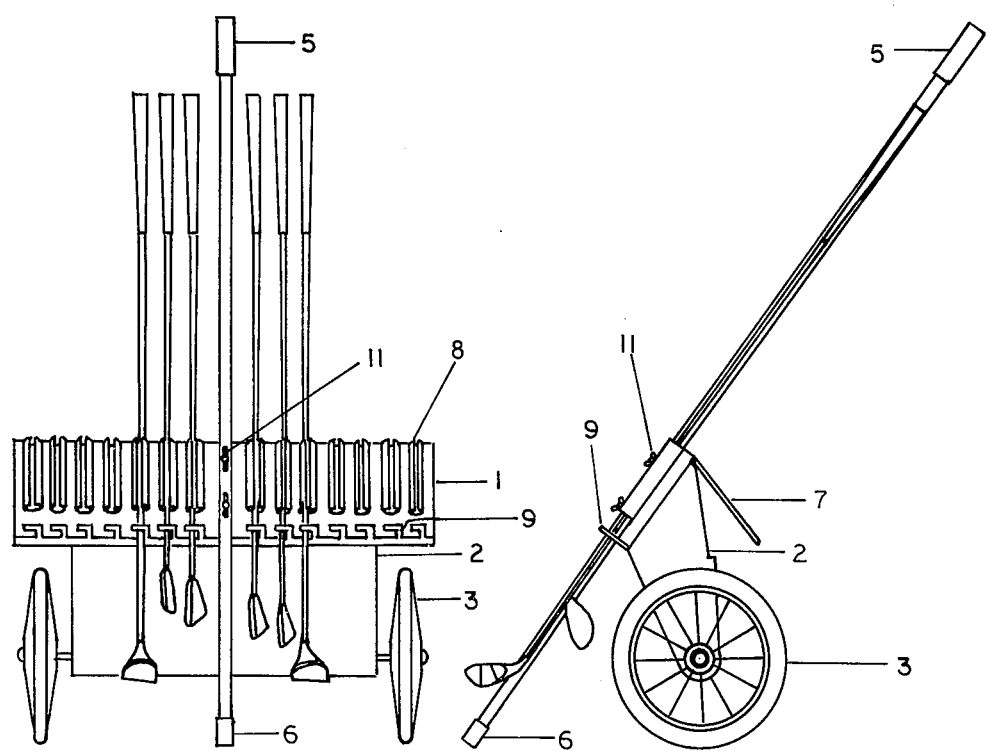

GOLF CART

This invention relates to a golf cart and more particularly to a cart which will permit the placement of golf clubs on a carrying platform and to securely hold the shafts of the clubs so they will not move and bang against each other when the cart is being pulled.

Golf carts which are designed to carry clubs with the club heads in a downward position in order to keep the center of gravity low, provide pockets or cavities to hold the heads of the clubs in place. The design of these pockets in a cart is costly and also adds weight and makes the design of the cart complicated. One object of this invention is to provide a cart which eliminates the use of cavities or pockets to hold the club heads in place. A simple mechanism holds the clubs in place in this invention permitting the locking and unlocking of the clubs to the cart by simply manipulating the golf clubs by their grips.

Another object of this invention is to provide a simple, inexpensive light weight and strong golf cart, using plastic for much of its construction instead of metal. The locking mechanism tubes, the platform on which they are mounted, the container for carrying clothes, golf balls and shoes, the handle and the wheels can be made of strong plastic thus producing a golf cart which is simple, inexpensive, light weight and strong.

Still another object of this invention is to provide a golf cart which will accept the standard number of clubs in a single row so as to make the selection of clubs easier and still keep the width of the cart no wider than carts having a double row of clubs.

This is accomplished by lining up the clubs on the platform of the cart so that the grip ends are at the same level. The heads of the "irons" will then line up at one level and the heads of the "woods" at another level. This club arrangement will then provide the needed space for the "woods" without sacrificing space for the "irons".

The features of the present invention believed to be novel are set forth with particularity in the appended claims.

The invention and its objects will be further clarified from reading the following description in conjunction with the drawings in which FIG. 1 is a front view of a golf cart embodying the principle set forth, 14 holding mechanism and sixth clubs are shown only, for purpose of clarity.

FIG. 2 is a side elevation of the cart.

FIG. 3 is a perspective view showing the holding mechanisms and the metallic hooks mounted on the platform of the golf cart.

FIG. 4 shows a simplified and less expensive construction of the holding mechanism.

The golf cart consists of a plastic platform 1 slanted back at about 45° from the vertical. This platform forms the top of a plastic container 2 which is used for storing golf balls, shoes, clothing, etc. Rotatably mounted to the sides of the plastic container are two wheels, 3. A handle 4, made from light weight tubing is fastened by means of two wing nuts 11 to the top of the platform and at the top end of the tubing there is a rubber grip 5 and at the lower end a rubber plug 6. A plastic cover 7 hinged at the top of the container is shown in FIG. 2. Mounted to the platform, are the holding mechanisms 8 and a metallic stamping 9 shaped in the form of spaced hooks.

The club holding mechanisms which are shown in detail in FIG. 3 are mounted on the platform of the cart. Each holding mechanism consists of a plastic tube which has a section cut out of its length and is fastened to the platform with its open side up. Inside the tube, there is a coating of rubber so that when the shaft of the club is engaged inside the tube, it will be snug and will not slip. Fastened to the bottom end of the platform and in line with the plastic tube, there is a metallic hook which is plastic covered.

To secure the club on the platform, the player holds the club by its grip and engages the lower end of the shaft in the hook, then, by exerting pressure downward the shaft of the club will slip into the plastic tube locking itself in position. Until such a time as an upward positive pressure is applied to the grip of the club by the player to disengage the club, the club will remain in its locked position.

FIG. 4 shows an alternative design for a holding mechanism which is simpler and less expensive than the mechanism shown in FIG. 3. The holding mechanism are made from a hard rubber, one piece molding 10, fastened to the plastic platform 1.

The invention has been described herein in connection with a preferred embodiment, but various changes may be made in the details of construction and in the manner of fabrication without departing from the principles and spirit of the invention as defined in the appended claims.

What I claim is:

1. A golf cart comprising: a container having a pair of opposed side walls, opposed front and rear walls, said rear wall having a partial opening therein, an enclosed bottom portion, and a top portion slanted downwardly and forwardly at approximately 45° from the vertical; wheels rotatably mounted on said side walls at the bottom portion thereof; a platform secured to said top portion of said container and forming the top thereof; flap means hingedly mounted on said rear wall to cover said opening; an elongated handle secured to said platform; a plurality of club holding means affixed to said platform, said holding means comprising resilient tubular members arranged generally vertically on said platform and having an upwardly opening longitudinal section cut out therefrom to thereby form clamps; and a plurality of club positioning means affixed to said platform, said positioning means comprising hook members opening in a substantially horizontal direction and being aligned with said holding means, whereby said holding means grip said clubs along the lower portion of the shafts thereof and said positioning means provide a fulcrum point which, when engaged, allows easy insertion and removal of said clubs from said holding means.

2. A golf cart as defined in claim 1, wherein said handle is detachably secured to said platform.

3. A golf cart as defined in claim 2, wherein said handle is secured to said platform by means of screws and wing nuts.

4. A golf cart as defined in claim 1, wherein said holding means are each fabricated of a plastic having a non-slip inner surface.

5. A golf cart as defined in claim 4, wherein said non-slip surface is provided by a rubber coating.

6. A golf cart as defined in claim 1, wherein said positioning means comprises a row of metallic hooks.

7. A golf cart as defined in claim 6, wherein said hooks are plastic coated.

8. A golf cart as defined in claim 1, comprising 14 holding means and 14 positioning means.

* * * * *